United States Patent
Kim et al.

(10) Patent No.: US 10,047,851 B2
(45) Date of Patent: Aug. 14, 2018

(54) LUBRICATING APPARATUS FOR DIFFERENTIAL UNIT OF VEHICLE

(71) Applicants: Hyundai Motor Company, Seoul (KR); Kia Motors Corp., Seoul (KR)

(72) Inventors: Kyoung Wook Kim, Yongin-si (KR); Ki Hyup Kim, Hwaseong-si (KR); Tae Seok Seo, Hwaseong-si (KR); Seok Hyun Lee, Seoul (KR); Soon Ho Moon, Gwacheon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 15/364,760

(22) Filed: Nov. 30, 2016

(65) Prior Publication Data

US 2018/0066746 A1    Mar. 8, 2018

(30) Foreign Application Priority Data

Sep. 5, 2016   (KR) .................. 10-2016-0113585

(51) Int. Cl.
*F16H 57/04*    (2010.01)
*F16H 57/037*   (2012.01)

(52) U.S. Cl.
CPC ....... *F16H 57/0457* (2013.01); *F16H 57/037* (2013.01); *F16H 57/0423* (2013.01); *F16H 57/0424* (2013.01); *F16H 57/0453* (2013.01); *F16H 57/0483* (2013.01)

(58) Field of Classification Search
None
See application file for complete search history.

(56) References Cited

U.S. PATENT DOCUMENTS

| | | | |
|---|---|---|---|
| 5,505,112 A * | 4/1996 | Gee ...................... | F16H 57/0447 180/339 |
| 8,650,980 B2 * | 2/2014 | Lafer .................. | B60K 17/344 74/467 |
| 9,683,651 B2 * | 6/2017 | Fukasawa ............ | F16H 57/043 |

(Continued)

FOREIGN PATENT DOCUMENTS

| JP | 59140963 A * | 8/1984 | ......... F16H 57/0421 |
|---|---|---|---|
| JP | 2004-36633 A | 2/2004 | |

(Continued)

OTHER PUBLICATIONS

JP 2012220004 translation (Year: 2012).*

*Primary Examiner* — Ramya Prakasam Burgess
*Assistant Examiner* — Timothy Hannon
(74) *Attorney, Agent, or Firm* — Morgan, Lewis & Bockius LLP

(57) ABSTRACT

A lubricating apparatus for a differential device of vehicle may include a ring gear mounted in the inside of a housing mounted at an oil pan, the ring gear being provided such that at least a portion of a lower portion of the ring gear is submerged into oil to churn the oil by being rotated; and a gear casing including a partition wall which is provided to surround an outer peripheral surface of the ring gear and allows the oil to flow into between the partition wall itself and the ring gear and a restriction part which is located in a front of the ring gear and formed with a top end portion facing an upper portion of the housing to limit an amount of the oil flowing into between the partition wall and the ring gear.

8 Claims, 7 Drawing Sheets

(56) References Cited

U.S. PATENT DOCUMENTS

| | | | | |
|---|---|---|---|---|
| 9,810,311 B1* | 11/2017 | Zhang | ............... | F16H 57/0423 |
| 2006/0048600 A1* | 3/2006 | Taguchi | ............. | F16H 57/0483 |
| | | | | 74/607 |
| 2016/0076636 A1* | 3/2016 | Kito | ..................... | F16H 3/663 |
| | | | | 475/220 |
| 2016/0377164 A1* | 12/2016 | Fast | ................... | F16H 57/0423 |
| | | | | 475/160 |
| 2017/0102065 A1* | 4/2017 | Ohmura | ............. | F16H 57/0423 |
| 2017/0159797 A1* | 6/2017 | Kawabuchi | ......... | F16H 57/0453 |

FOREIGN PATENT DOCUMENTS

| | | | |
|---|---|---|---|
| JP | 2012-062995 A | 3/2012 | |
| JP | 2012-220004 A | 11/2012 | |
| JP | 2013-108595 A | 6/2013 | |
| JP | 2015-045343 A | 3/2015 | |
| JP | 2015-068488 A | 4/2015 | |
| KR | 10-2010-0115458 A | 10/2010 | |
| KR | 10-2011-0110242 A | 10/2011 | |

* cited by examiner

LUBRICATING APPARATUS FOR DIFFERENTIAL UNIT OF VEHICLE

CROSS REFERENCE TO RELATED APPLICATION

The present application claims priority to Korean Patent Application No. 10-2016-0113585 filed on Sep. 5, 2016, the entire contents of which is incorporated herein for all purposes by this reference.

BACKGROUND OF THE INVENTION

Field of the Invention

Various embodiments of the present invention relates to a lubricating apparatus for a differential device of a vehicle, and more particularly, to a lubricating apparatus for a differential device of a vehicle for transmitting force to wheels of a vehicle while allowing a difference of revolution that can occur between two wheels at both sides of the vehicle according to the vehicle running condition.

Description of Related art

In vehicles, there is a possibility of occurring a difference of rotational speed between the left and right vehicle wheels according to the running condition of the vehicles. In order to transmit torque to vehicle wheels at both sides while allowing such a difference of rotation, a differential unit is provided.

The differential unit is provided with various types of gears such as a ring gear and the like in such a manner that a plurality of gears engage with each other to transmit power to vehicle wheels at both sides while absorbing a difference of rotation between the two wheels.

In this case, in order to prevent the plurality of gears from being worn and prevent generation of impact, it is required to properly lubricate the differential unit with oil during running of the vehicle.

Thus, it is an important task to provide a lubricating apparatus for a differential unit that can minimize consumption of power for supplying oil to the differential unit and meet an amount of oil required for the differential unit effectively.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lubricating apparatus for a differential device of a vehicle that can minimize power to be consumed for lubricating the differential device and the like and at the same time provide effective lubrication performance.

A lubricating apparatus for a differential device of the vehicle according to an exemplary embodiment of the present invention for accomplishing the object as mentioned above includes a ring gear mounted in the inside of a housing mounted at an oil pan, the ring gear being provided in such that at least a portion of a lower portion of the ring gear is submerged into oil to churn the oil by being rotated; and a gear casing including a partition wall which is provided to surround an outer peripheral surface of the ring gear and allows the oil to flow into between the partition wall itself and the ring gear and a restriction part which is located in a front of the ring gear and formed with the top end portion facing an upper portion of the housing to limit an amount of the oil flowing into between the partition wall and the ring gear.

The restriction part extends from a portion of the partition wall surrounding a lower side of the ring gear along an axial direction of the ring gear to block the oil positioned at a height below the top end portion from flowing into between the ring gear and the partition wall.

The restriction part may extend from the partition wall to an inner wall of the housing located at a front side of the ring gear.

The restriction part may be provided to shield a front side of the lower side of the ring gear among an open front face of the gear casing so that the restriction part blocks the oil positioned at the height below the upper end portion from flowing into between the ring gear and the partition wall.

The gear casing is provided with a rear wall for shielding a rear face of the ring gear wherein the rear wall is formed with a first opening at a position on a peripheral side thereof, to which the oil rises by being churned by the ring gear, so that at least a portion of the oil being churned by low speed rotation of the ring gear is discharged through the first opening.

The partition wall is formed with a second opening at a position where the oil rises by being churned by the ring gear so that at least a portion of the oil being churned by high speed rotation of the ring gear is discharged through the second opening.

The lubricating apparatus may further comprise a rear wall arranged in the gear casing to shield the rear face of the ring gear; a through opening provided on an axis of a reduction driven gear mounted on the top portion of the ring gear, the through opening being mounted such that it extends along an axial direction of the reduction driven gear so that the oil flows therein; and a baffle provided to be projected from the rear wall toward the rear side and guide the oil discharged to the rear side of the gear casing through the through opening, wherein the oil flows toward the axis of the ring gear.

The baffle may be provided in a plate shape extended along a radial direction of the ring gear.

The baffle may be provided as a pair of baffles such that the oil discharged from the through opening can flow into a gap space where the baffles are spaced with each other.

According to the lubricating apparatus for a differential device of the vehicle, configured as mentioned above, it is possible to minimize power to be consumed for lubricating the differential device and the like and at the same time provide effective lubrication performance.

The ring gear is mounted to a first side of the oil pan to churn the oil by being rotated and the gear casing is provided in a shape surrounding the ring gear, in particular the lower and outer peripheral surface of the ring gear, so that an amount of the oil churned by the ring gear is limited but a sufficient amount of the oil is churned, reducing churning loss greatly.

Furthermore, the gear casing is provided with the rear wall for shielding the rear face of the ring gear and the restriction part of the gear casing is provided to shield the front face of the lower side of the ring gear, so that the amount of the oil churned by the ring gear is limited and hence churning loss is reduced effectively.

On the other hand, the rear wall of the gear casing is provided with a first opening such that some of the oil churned by the ring gear is discharged to an outside of the gear casing, so that effective circulation of the oil can be made and at the same time it is possible to effectively prevent the amount of the oil churned by the ring gear from being increased.

In addition, the partition wall of the gear casing is provided with a second opening such that some of the oil churned by the ring gear is discharged to the outside of the gear casing, so that effective circulation of the oil can be made by virtue of rotation of the ring gear along with assistance of the first opening.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
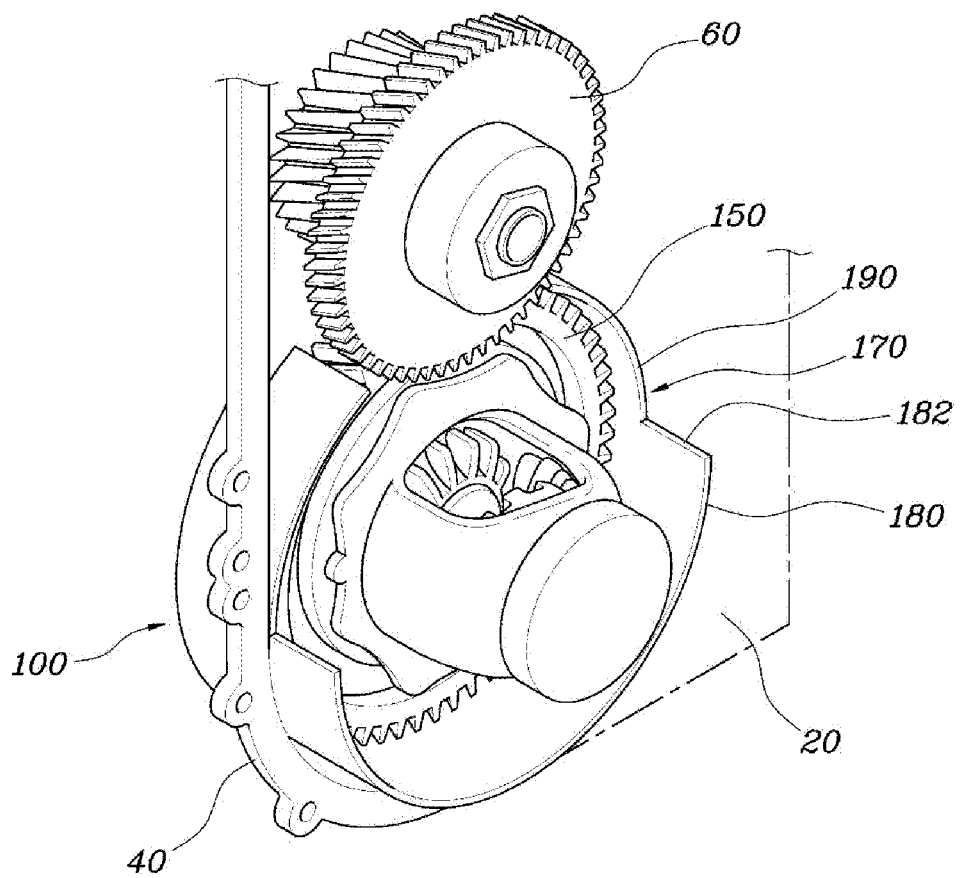
FIG. 1 is a view illustrating a lubricating apparatus for a differential device of a vehicle, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will now be described in detail with reference to the accompanying drawings. However, the present invention is not limited or restricted by the exemplary embodiments.

As shown in FIGS. 1, 2, 5, 6 and 7, a lubricating apparatus 100 for a differential device of the vehicle according to an exemplary embodiment of the present invention includes a ring gear 150 mounted in the inside of a housing 40 mounted at an oil pan 20, the ring gear being provided such that at least a portion of a lower portion of the ring gear is submerged into oil to churn the oil by being rotated; and a gear casing 170 including a partition wall 190 which is provided to surround an outer peripheral surface of the ring gear 150 and allows the oil to flow into between the partition wall itself and the ring gear 150 and a restriction part 180 which is located in a front of the ring gear 150 and formed with the top end portion 182 facing an upper portion of the housing 40 to limit an amount of the oil flowing into between the partition wall 190 and the ring gear 150.

The ring gear 150 is mounted in the inside of the housing 40 mounted at the oil pan 20 and at least a portion of the ring gear is arranged to submerge into the oil to churn the oil by rotation of the ring gear.

The ring gear 150 is provided at its center portion with a differential chamber protruding to the front side thereof. The direction in which the differential chamber is positioned relative to the ring gear 150 is defined herein as the front direction. FIG. 1 shows the differential chamber formed in a shape protruding to a front of the ring gear 150.

The oil pan 20 stores the oil. The oil pan 20 may be positioned under a valve body chamber of a transmission. It may be provided separately and arranged independently from the transmission.

The lubricating apparatus 100 for a differential device of the vehicle according to an exemplary embodiment of the present invention performs oil lubrication. According to an exemplary embodiment of the present invention, the lubricating apparatus does not have a separate power apparatus for lubricating the oil, but it is configured such that the oil is churned by rotation of the ring gear 150 and supplied to the ring gear 150 and peripheral devices.

Figure 5:
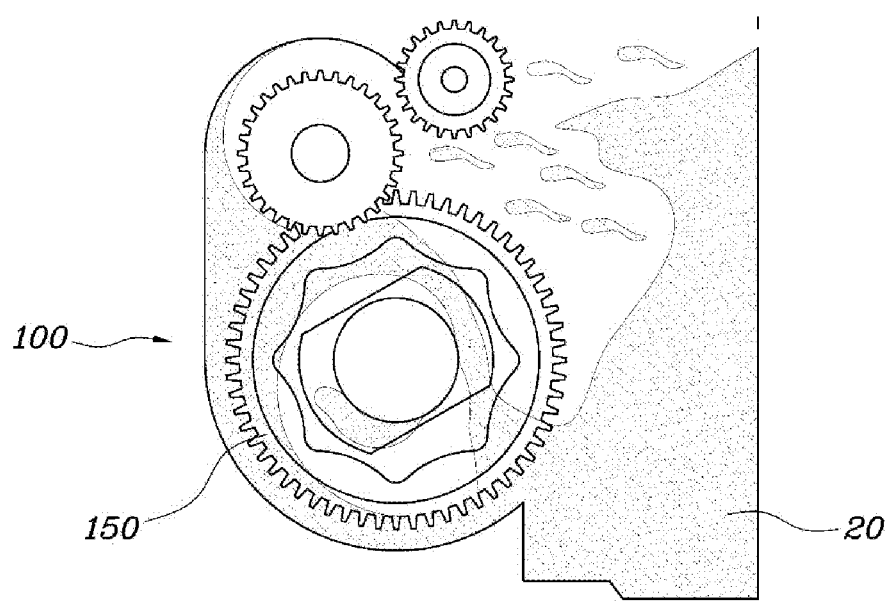
FIG. 5 is a view illustrating a state that oil is churned by a ring gear under the condition that a gear casing is omitted from a lubricating apparatus for a differential device of the vehicle, according to an exemplary embodiment of the present invention.

FIG. 5 shows a state that the oil is churned by the ring gear 150 as mentioned above. The ring gear 150 is preferably arranged in a shape erected vertically with respect to the free surface of the oil so that when it rotates, it forces the oil contacting with it to rise in its rotational direction.

Further, according the present invention, the ring gear 150 is mounted in the inside of the housing 40 mounted at the oil pan 20, wherein the housing 40 delimits a gap space in which the ring gear 150 is mounted and at least a portion of the housing is preferably formed in a shape that corresponds to the ring gear 150 and surrounds an outside of the ring gear 150.

In case where such a housing 40 is mounted in the oil pan 20, it is advantageous in that the oil stored in the oil pan 20 naturally flows into the housing 40 and hence it is at the same oil level in each of them.

That is, the housing 40 is preferably arranged to share the inside space with the oil pan 20. To this end portion, the housing 40 may be provided integrally with a casing constituting the oil pan 20, or otherwise it can be provided such that it is produced separately and then coupled to the casing of the oil pan 20.

The ring gear 150 to be mounted in the housing 40 is arranged such that its lower portion is submerged in the oil existing within the housing 40. Therefore, the oil in contact with the lower portion of the ring gear 150 rises along with the rotating ring gear 150 by its viscous force or teeth of the ring gear 150.

The raised oil is scattered to an upper side of the ring gear 150 and then collected to the oil pan 20 or the lower portion of the housing 40 by a weight thereof. The oil scattered to an upper side of the ring gear 150 flows from the upper portion to the lower portion of the ring gear 150 and hence it is provided as lubricant oil to bearings of the ring gear 150, or it is fed into the differential chamber and hence used in lubricating various gears including a side gear and a pinion gear which are accommodated in the differential chamber.

On the other hand, the gear casing 170 is provided with a partition wall 190 which is provided to surround an outer peripheral surface of the ring gear 150 and allows the oil to flow into between the partition wall itself and the ring gear 150 and a restriction part 180 which is located in a front of the ring gear 150 and formed with the top end portion 182 facing the upper portion of the housing 40 to limit an amount of the oil flowing into between the partition wall 190 and the ring gear 150.

The partition wall 190 is preferably provided to surround the outer peripheral surface of the ring gear 150. However, in the present exemplary embodiment of the present invention, the upper portion 155 of the ring gear 150 may be engaged with a reduction driven gear 60. In the instant case, the partition wall 190 may be provided to surround the outer peripheral surface of the ring gear except a portion at the upper portion 155 side of the ring gear 150, which is engaged with the reduction driven gear 60.

It will be apparent to those of ordinary skill in the art that a portion except the upper portion may beset as the portion to be engaged with the reduction driven gear portion 60 at a design point and therefore an opening portion of the partition wall 190 may be formed in a portion except the upper portion.

In addition, the restriction part 180 is positioned at the open front side of the partition wall 190. The restriction part 180 may be formed in a plurality of shapes including a plate provided to shield at least a portion of the open front face of the partition wall 190 or an arc shape extending along an axial direction of the ring gear 150 from the lower portion of the partition wall 190.

Figure 2:
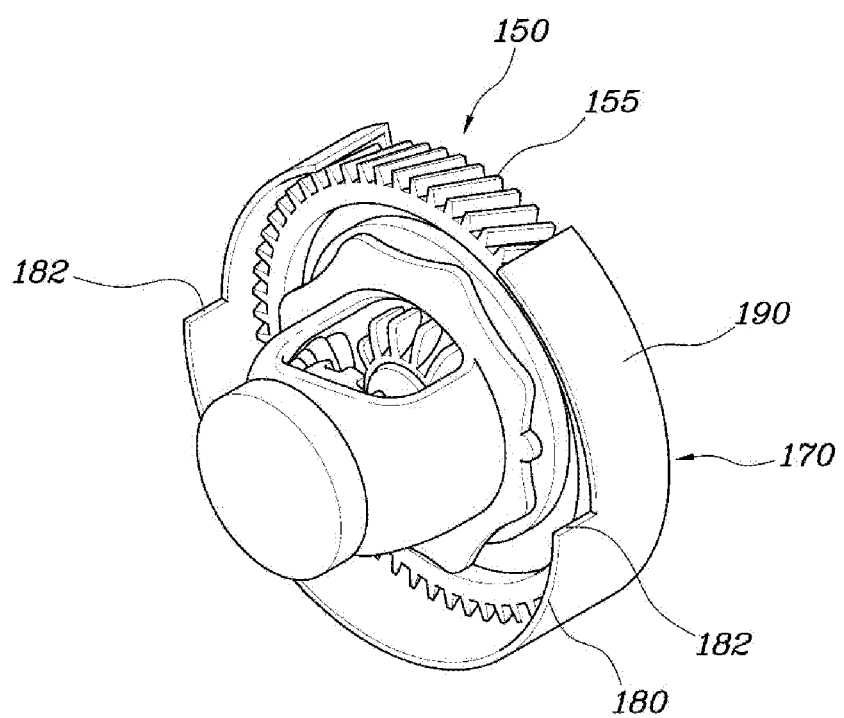
FIG. 2 is a view illustrating a ring gear mounted in a gear casing of a lubricating apparatus for a differential device of the vehicle, according to an exemplary embodiment of the present invention.
Figure 3:
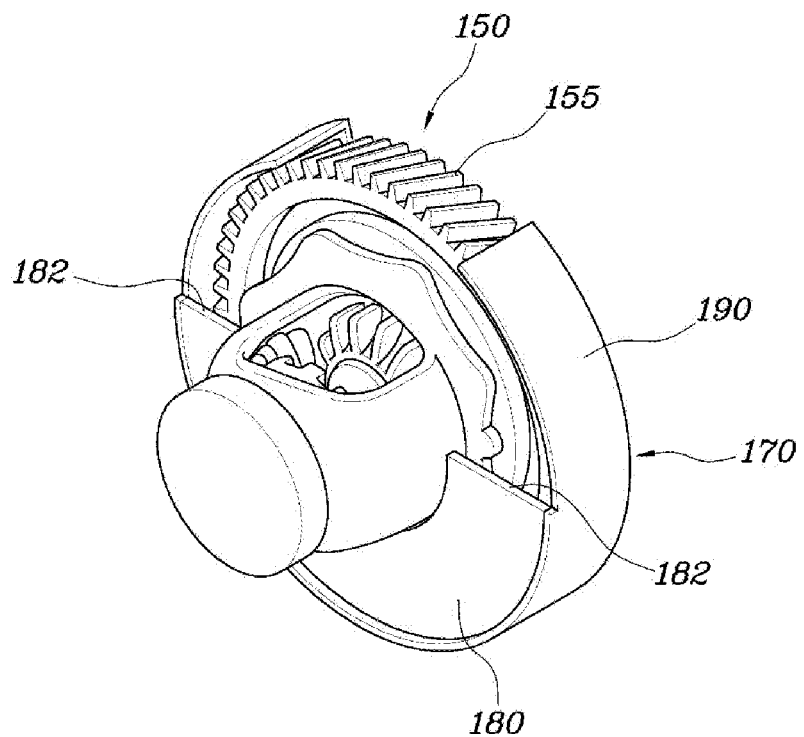
FIG. 3 is a view illustrating a restriction part of a gear casing provided to shield a front face of a ring gear in a lubricating apparatus for a differential device of the vehicle, according to an exemplary embodiment of the present invention.

FIG. 2 shows a condition that he restriction part 180 extending from the partition wall 190 to the front side of the ring gear 150 is formed integrally with the partition wall 190 in accordance with an exemplary embodiment of the present invention while FIG. 3 shows a condition that the restriction part 180 is formed as a plate to shield a portion of an open front face of the partition wall 190 in accordance with another exemplary embodiment of the present invention.

In the example shown in FIG. 2, the restriction part 180 may be produced separately from the partition wall 190 and then coupled to the partition wall and it may be made from material different from that of the partition wall 190. The restriction part 180 is formed integrally with the partition wall 190.

Similarly to the restriction part 180, the partition wall 190 is also preferably formed to be spaced apart by a predetermined distance from the outer peripheral surface of the ring gear 150 so that the oil flowing over the upper end portion 182 of the restriction part 180 exists between the partition wall 190 and the outer peripheral surface of the ring gear 150. In other words, the lower portion of the partition wall 190 also serves, along with the restriction part 180, to limit the amount of oil churned the ring gear 150.

On the other hand, the restriction part 180 of the gear casing 170 is positioned in a front of the ring gear 150 as described above and is formed with the top end portion 182 facing the upper portion of the housing 40. That is, the restriction part 180 may be formed to be positioned at the front side, in particular, the lower side of the ring gear (150) or the partition wall 190, wherein an upper front side of the partition wall 190 is in an open state.

When the gear casing 170 is not provided with the restriction part 180 according to an exemplary embodiment of the present invention, all of the oil located above the lowermost point of the ring gear 150 among oil introduced into the housing 40 will be churned by the ring gear 150. That is, most of the oil existing in the inside of the housing 40 is in a situation that it can be introduced between the ring gear 150 and the partition wall 190.

Therefore, all of the oil located between the level of the oil existing in such a housing 40 and the oil pan 20 and the lowermost point of the ring gear 150 becomes the subject of churning when the ring gear 150 rotates, so that the ring gear 150 will churn an excessive oil more than an amount of the oil required for lubrication when it rotates, increasing churning loss unnecessarily.

The term "churning loss" as stated herein is meant by torque consumed by the ring gear 150 to churn the oil. The churning loss can be understood as power consuming motive power supplied from the engine. Consequently, when the churning loss increases, the motive power consumed unnecessarily is increased and hence efficiency of a transmission or engine efficiency is reduced.

In an exemplary embodiment of the present invention adopting a way that lubricant oil can be supplied by churning oil existing in the oil pan 20 or the housing 40 by rotation of the ring gear 150 without a separate power device, the restriction part 180 is arranged to limit an amount of the oil churned by the ring gear 150 to a certain level to prevent the churning loss from being increased unnecessarily due to excessive amount of the oil churned by the ring gear 150.

The restriction part 180 provided at the lower side of the front face of the ring gear 150 as described above is provided with the top end portion 182 facing the upper portion of the housing 40 as shown in FIG. 1 and FIG. 2.

The oil flows into the housing 40 provided at a first side of the oil pan 20 from the oil pan 20. In the instant case, the level of the free surface of the oil that allows the oil to flow into the gap space between the restriction part 180 and the ring gear 150 is preferably determined by the restriction part 180.

That is, as for the oil in the oil pan 20, only a portion existing in a higher position than the top end portion 182 of the restriction part 180 flows over the top end portion 182 and flows into between the ring gear 150 and the restriction part 180. Therefore, the oil existing between the ring gear 150 and the restriction part 180 becomes the subject of churning when the ring gear 150 rotates.

Accordingly, the oil churned by rotation of the ring gear 150 is limited by the restriction part 180 so that churning loss of the ring gear 150 is significantly reduced because only such limited amount of the oil is churned.

A distance spaced apart between the restriction part 180 and the ring gear 150 can be set variously as necessary. For example, it may be set to have a distance of 1 mm or less. In addition, a height of the top end portion 182 of the restriction part 180 may also be set variously.

FIGS. 1 shows a condition that the restriction part 180 mounted at the gear casing 170 is located between the ring gear 150 and the inner wall of the housing 40 and FIG. 2 shows a condition that the gear casing 170 provided with the restriction part 180 is mounted around the ring gear 150. FIG. 3 shows a condition that the restriction part 180 is formed as a plate to shield the lower side of an open front face of the ring gear 150 in accordance with the present invention.

Figure 6:
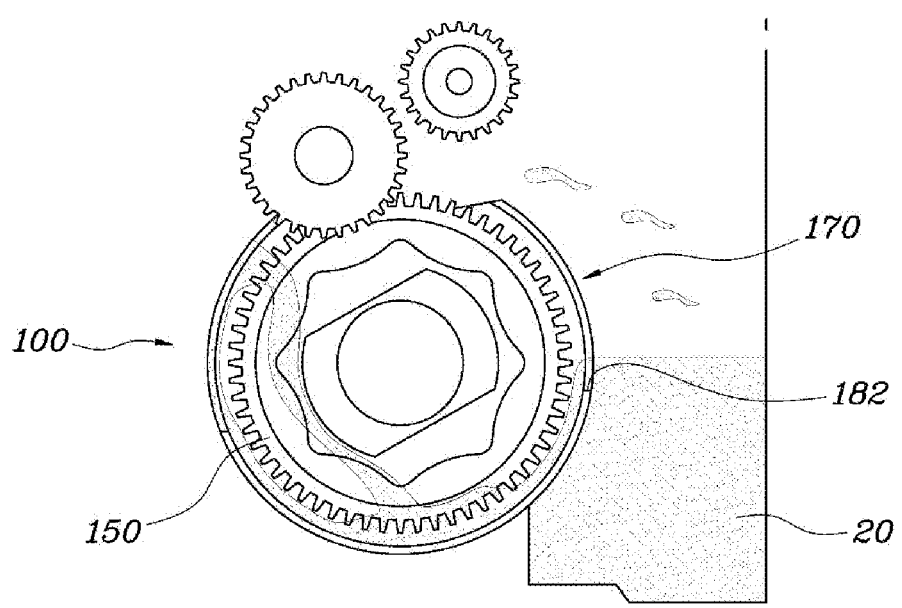
FIG. 6 is a view illustrating a state that oil is churned by a ring gear under the condition that a gear casing is not omitted from a lubricating apparatus for a differential device of the vehicle, according to an exemplary embodiment of the present invention.

FIG. 5 shows a condition that the oil is churned by the ring gear 150 in a case where such a gear casing 170 is not provided. FIG. 6 shows a condition that the oil is churned by the ring gear 150 in a case where the gear casing 170 is provided. Comparing FIG. 6 with FIG. 5, it can be identified that as the gear casing 170 is provided with the restriction part 180, an amount of the oil churned by the ring gear 150 is limited and an amount of the oil churned and scattered by the ring gear 150 is also reduced.

Figure 7:
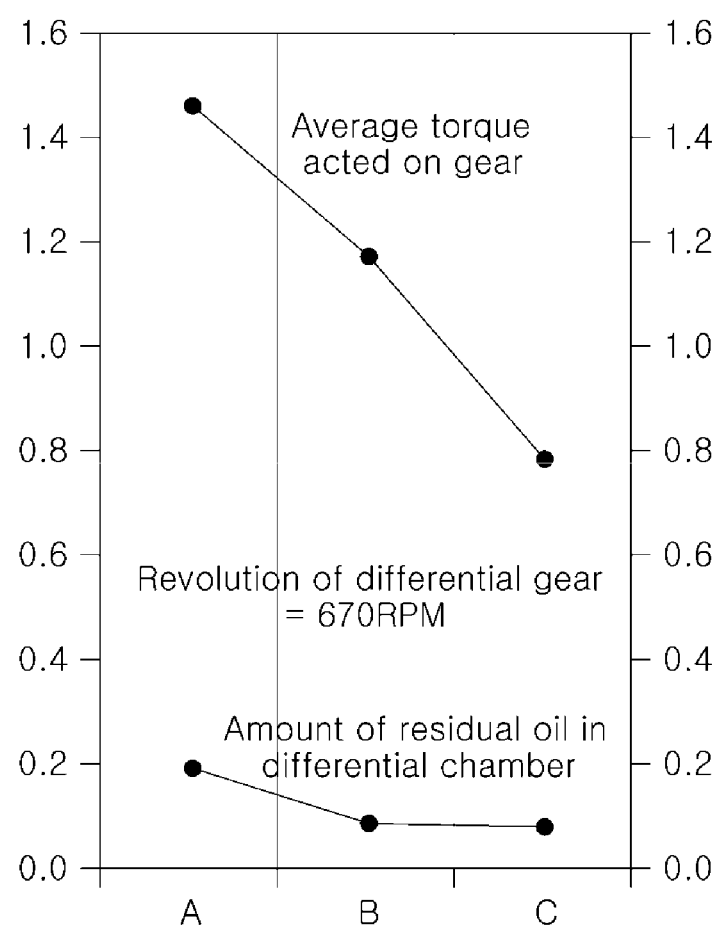
FIG. 7 is a graph showing a change of churning loss depending on as to whether a gear casing is mounted at a lubricating apparatus for a differential device of the vehicle, according to an exemplary embodiment of the present invention.

FIG. 7 is a graph showing the churning loss and the amount of oil which vary depending on application of the gear casing 170. In FIG. 7, the churning loss is referred to as 'average torque acted on gears', the symbol A indicates a condition that the gear casing 170 is not applied, the symbol B indicates a condition that the gear casing 170 is applied, and the symbol C indicates a condition that the gear casing 170 is provided with a front cover 210 as described later.

The present invention corresponds to the condition B. Comparing the condition B with the condition A, it can be seen that the churning loss acting on the ring gear 150 is reduced and the amount of the oil congested and remaining in the differential chamber is reduced. In case of the condition A, it can be seen that an excessive amount of the oil is churned and hence the amount of the oil congested and remaining in the differential chamber is larger than that in the condition B. This is understood as meaning non-efficiency of lubrication.

After all, according to an exemplary embodiment of the present invention, since the gear casing 170 is provided with the restriction part 180 formed in a shape surrounding the lower and outer peripheral surface of the ring gear 150 in a structure in which oil is churned by mean of rotation of the ring gear 150 such that the differential chamber, bearings of the ring gear 150 and the like are lubricated, an amount of the oil churned by the ring gear 150 is limited effectively, so that the present invention reduces the churning loss of the ring gear 150, facilitates effective supply of lubricant oil and ultimately contributes to enhancing fuel economy and engine efficiency.

On the other hand, in the lubricating apparatus 100 for a differential device of the vehicle according to the present exemplary embodiment of the present invention, the top end portion 182 of the restriction part 180 is preferably formed to be positioned over the level of the free surface of the oil in the oil pan 20 under the condition before the ring gear 150 rotates, as shown in FIGS. 2, 5 and 6.

As explained previously, the top end portion 182 of the restriction part 180 is provided so as to set the level of the free surface of the oil flowing into between the ring gear 150 and the restriction part 180. However, when the height of the top end portion 182 is positioned higher than the level of the free surface of the oil existing in the oil pan 20 before the differential device operates (i.e., rotation of the ring gear 150), then the oil is fully charged into the gap space between the ring gear 150 and the partition wall 180, increasing the churning loss.

Therefore, the top end portion 182 of the restriction part 180 may be positioned to have a height higher than the level of the free surface of the oil in the oil pan 20 under the condition before the differential device operates, wherein the level of the free surface of the oil in the oil pan 20 is understood as being the same as in the housing 40 and the condition before the differential device operates is the condition that circulation of the oil does not occur and understood as the condition that the level of the free surface of the oil in the oil pan has a height lower than after operation of the differential device.

On the other hand, in the lubricating apparatus 100 for a differential device of the vehicle according to an exemplary embodiment of the present invention as shown in FIG. 1 and FIG. 2, the restriction part 180 extends from a portion of the partition wall 190 surrounding the lower side of the ring gear 150 along an axial direction of the ring gear 150 to block the oil positioned at a height below the top end portion 182 from flowing into between the ring gear 150 and the partition wall 190.

As explained previously, the restriction part 180 is provided to limit an amount of the oil flowing into the gap space between the ring gear 150 and the partition wall 190. The restriction part 180 can formed in a variety of shapes. In one exemplary embodiment of the present invention, the restriction part 180 is provided to be extended from the partition wall 190 along an axial direction of the ring gear 150.

The partition wall 190 is provided to surround the outer peripheral surface of the ring gear 150 and hence shape of its cross section when viewed from a front of the ring gear 150 may be substantially circular, wherein the restriction part 180 provided to extend from the lower portion of such partition wall 190 along an axial direction of the ring gear 150 has a substantially circular arc shaped cross section when viewed from a front of the ring gear 150. This appearance is shown in FIG. 1 and FIG. 2.

The restriction part 180 having such a shape is preferably positioned such that both end portions thereof are positioned at the uppermost portion so that it corresponds to the top end portion 182. Referring to FIG. 1 and FIG. 2, it can be seen that the restriction part 180 extending from the lower portion of the partition wall 190 and having the circular arc shaped cross section is formed with a pair of the top end portions 182.

Since the restriction part 180 is provided in provided in a form extending from the partition wall 190, oil existing below the top end portion 182 of the restriction part 180 is blocked from flowing into the gap space between the partition wall 190 and the ring gear 150 by the restriction part 180. Therefore, in order for the oil to flow into the gap space, the oil may flow over the top end portion 182 of the restriction part 180.

The restriction part 180 and the partition wall 190 may be made integrally, or otherwise produced separately and then coupled with each other. However, when the restriction part 180 is produced separately from the partition wall 190 and then coupled with the partition wall 190, any gap may not exist between the partition wall 190 and the ring gear 150, wherein the oil positioned at a height below the top end portion 182 is configured to be blocked from flowing into between the partition wall 190 and the ring gear.

On the other hand, in the lubricating apparatus 100 for a differential device of the vehicle according to an exemplary embodiment of the present invention, the restriction part extends from the partition wall to an inner wall of the housing located at a front side of the ring gear.

In an exemplary embodiment of the present invention, the housing 40 preferably encloses a periphery of the ring gear 150 and sets the mounting position of the ring gear 150. When the restriction part 180 extending from the partition wall 190 surrounding the outer peripheral surface of the ring gear 150 extends to an inner wall of the housing 40 in a front of the ring gear 150, the front face of the restriction part 180 is shielded by the housing 40 so that oil is configured to be blocked from flowing therein.

That is, the present exemplary embodiment of the present invention is configured, wherein only the oil flowing over the top end portion 182 of the restriction part 180 can flow into the gap space between the partition wall 190 and the ring gear 150.

On the other hand, in the lubricating apparatus 100 for a differential device of the vehicle according to another exemplary embodiment of the present invention as shown in FIGS. 3 and 7, the restriction part 180 is provided to shield the front lower side of the ring gear 150 among the open front face of the gear casing 170, wherein the oil positioned at a height below the top end portion 182 is configured to be blocked from flowing into between the ring gear 150 and the partition wall 190.

in one exemplary embodiment of the various embodiments of the present invention, the restriction part 180 is provided in a form of a front cover shielding the lower side of the front face of the gear casing 170. This restriction part 180 is mounted such that oil flows into the open front side of the gear casing 170 to prevent an amount of the oil churned by the ring gear 150 from being increased.

That is, in the present exemplary embodiment of the present invention, the restriction part 180 shields the lower portion of the front face of the ring gear 150 to block oil from flowing through the lower portion so that an amount of the oil churned by the ring gear 150 is limited effectively.

This restriction part 180 provided to have such a shape is shown in the FIG. 3. This restriction part 180 is provided to shield the lower portion of the front face of the ring gear 150 such that the top end portion 182 is formed at a lower position than the uppermost end portion of the ring gear 150.

Preferably, in the present exemplary embodiment, the restriction part 180 is mounted such that its cross section when viewed from the front side of the ring gear 15 corresponds to a portion of a circular shape formed by the partition wall 190 and, The top end portion 182 is formed to be flush with the oil level.

FIG. 3 shows a configuration that the front face of the gear casing 170 is provided with the front cover 210. FIG. 7 shows a graph comparing a condition A that the gear casing 170 is not provided and an exemplary embodiment B in which the restriction part 180 is provided in a form extending from the partition wall 190 and an exemplary embodiment C in which the restriction part 180 is provided in a plate shape.

Figure 4:
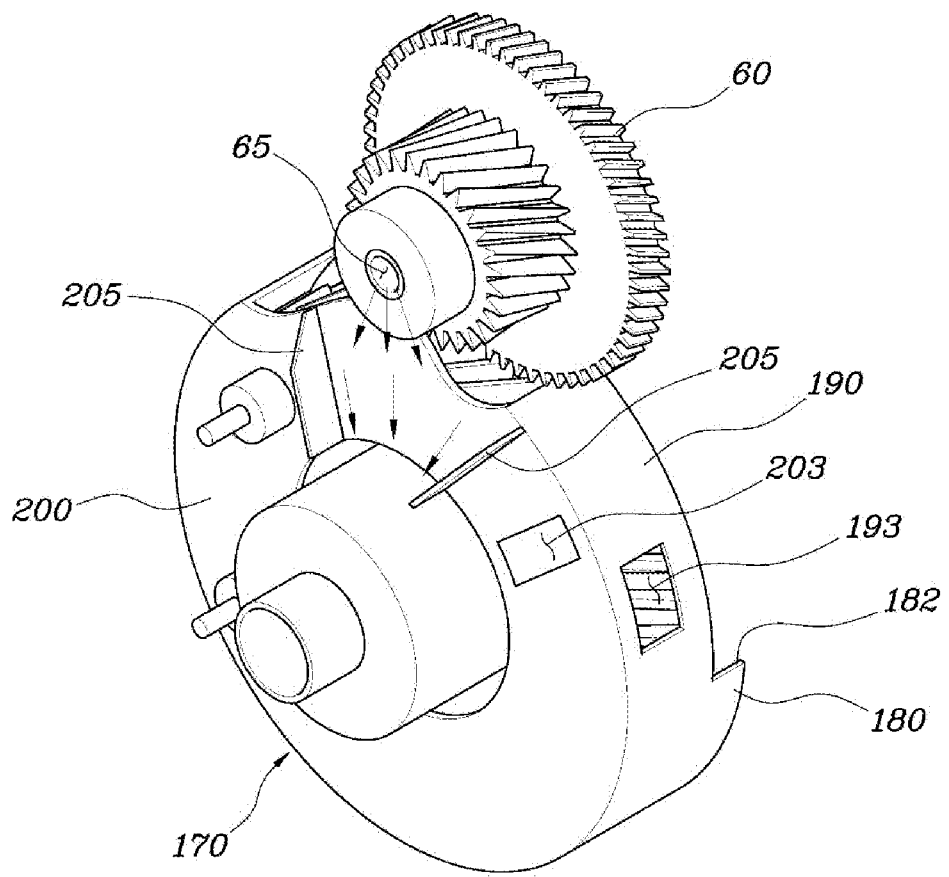
FIG. 4 is a view illustrating a rear wall of a gear casing in a lubricating apparatus for a differential device of the vehicle, according to an exemplary embodiment of the present invention.

On the other hand, in the lubricating apparatus 100 for a differential device of the vehicle according to an exemplary embodiment of the present invention as shown in FIG. 4, the gear casing 170 is provided with a rear wall 200 for shielding a rear face of the ring gear 150 wherein the rear wall 200 is formed with a first opening 203 at a position on a peripheral side thereof, to which the oil rises by being churned by the ring gear 150, so that at least a portion of the oil being churned by low speed rotation of the ring gear 150 is discharged through the first opening 203.

the gear casing 170 is mounted between the rear face of the ring gear 150 and the housing 40 to have the rear wall 200 for shielding the rear face of the ring gear 150. The rear wall 200 may be formed integrally with the partition wall 190 and the restriction part 180.

Furthermore, the peripheral side of the rear wall 200 is to be understood as a peripheral portion adjacent to the outer peripheral surface of the ring gear 150 and the point where the first opening 203 is provided is to be understood as a point to which the oil churned by the ring gear 150 rises.

Therefore, the first opening 203 is preferably mounted at a position higher than the oil level of the oil existing in the housing 40 or the oil pan 20 and its cross-sectional shape can be formed variously. FIG. 4 shows the first opening 203 formed on the rear wall 200 of the gear casing 170 in accordance with an exemplary embodiment of the invention.

When the ring gear 150 rotates at a low speed, oil churned by the ring gear 150 has a relatively small centrifugal force and hence rising movement of the oil occurs along the periphery of the rear side of the ring gear 150 rather than the outer peripheral surface of the ring gear 150.

In the present exemplary embodiment of the present invention, the oil rising along the periphery of the rear side of the ring gear 150 is forced to drain to an outside so that oil remaining in the inside of the gear casing 170 is removed effectively and smooth circulation of oil occurs.

That is, according to the present exemplary embodiment of the present invention, the oil churned and scattered along the outer peripheral surface of the ring gear 150 by rotation of the ring gear 150 is guided in its flow direction by the partition wall 190 to flow toward the reduction driven gear 60 and its meshing portion and bearings and thereby lubricates each of these parts, while under a low speed condition of the ring gear 150, some of the oil churned by the ring gear 150 is drained from the gear casing 170 through a first opening 203 provided on the rear wall 200 of the gear casing 170 so that the oil remaining unnecessarily in the gear casing 170 is removed and thereby it is possible to prevent an amount of the oil churned by the ring gear 150 from being increased.

On the other hand, in the lubricating apparatus 100 for a differential device of the vehicle according to an exemplary embodiment of the present invention as shown in FIG. 4, the partition wall 190 is provided with a second opening 193 at a point to which the oil churned by the ring gear 150 rises so that at least a portion of the oil churned by high speed rotation of the ring gear 150 is drained through the second opening 193.

The second opening 193 is formed at a portion on the partition wall 190 of the gear casing 170, to which the oil churned by the ring gear 150 rises. FIG. 4 shows a position of such second opening 193. The position of the second opening 193 can be understood as a position that does not face the oil pan 20.

When the ring gear 150 rotates at a high speed, oil churned by the ring gear 150 rises along most of the peripheral surface of the ring gear 150. Therefore, according to the present exemplary embodiment of the present invention, the second opening 193 is mounted at the portion of the partition wall 190 corresponding to the outer peripheral surface of the ring gear 150, so that the oil remaining in the gear casing 170 is drained effectively and hence smooth circulation of the oil is facilitated and at the same time the oil churned by the ring gear 150 can be prevented from increasing unnecessarily.

In an exemplary embodiment of the present invention, discrimination between the low speed rotation and the high speed rotation of the ring gear 150 can, in principle, be made by discriminating rotational speed of the ring gear 150. However, such discrimination of the rotational speed can be determined variously in strategic side. In an exemplary embodiment of the present invention, it is preferable to understand that discrimination between low speed rotation and high speed rotation is made particularly in their phenomenon aspect.

That is, it is to be understood that the low speed rotation of the ring gear 150 means a condition that centrifugal force acting on the oil churned by the ring gear 150 is smaller than that during the high speed rotation and hence an amount of the oil drained through the first opening 203 is larger than an amount of the oil drained through the second opening 193, while the high speed rotation of the ring gear 150 means a condition that centrifugal force acting on the oil churned by the ring gear is increased more than that during the low speed rotation and hence an amount of the oil drained through the second opening 193 is larger than an amount of the oil drained through the first opening 203.

In particular, if the ring gear 150 rotates at the high speed, the amount of the oil churned by the ring gear 150 is increased more than that during the low speed rotation and an amount of the oil flowing into the gear casing 170 per hour is also increased.

Consequently, if the ring gear 150 rotates at the high speed, an amount of the oil remaining in the gear casing 170 is increased more than that during the low speed rotation. Therefore, the present exemplary embodiment of the present invention is configured to have the second opening 193 such that residual amount of the oil increasing as above is appropriately drained and thereby churning loss is prevented from increasing unnecessarily and smooth circulation of the oil is facilitated.

FIG. 4 shows a configuration that the second opening 193 is mounted at the partition wall 190 of the gear casing 170. The first opening 203 and the second opening 193 may be mounted at positions adjacent to each other and their specific positional relationship may be determined variously in strategic side.

On the other hand, the lubricating apparatus 100 for a differential device of the vehicle according to an exemplary embodiment of the present invention as shown in FIG. 4 further includes a rear wall arranged in the gear casing to shield the rear face of the ring gear; a through opening provided on an axis of a reduction driven gear mounted on a top portion of the ring gear, the through hole being provided in such a manner that it extends along an axial direction of the reduction driven gear so that the oil flows therein; and a baffle provided to be projected from the rear wall of the gear casing toward the rear side and guide the oil discharged to the rear side of the gear casing through the through opening, wherein the oil flows toward the axis of the ring gear.

in the embodiment of the present invention, the reduction driven gear 60 is provided on the top portion 155 of the ring gear 150 such that it meshes with the latter wherein the central axis of the reduction driven gear 60 is set in the same direction as the central axis of the ring gear 150 and a central shaft of the reduction driven gear 60 is formed with a hollow bore allowing the oil to flow therethrough. The hollow bore corresponds the through opening 65 in the embodiment of the present invention. The oil can be supplied to the rear side of the reduction driven gear 60 through the through opening 65 of the reduction driven gear 60.

On the other hand, the oil discharged from the through opening 65 flows from the rear side of the reduction driven gear 60 to the lower side by a weight thereof. At this time, the baffle 205 guides the oil discharged from the through opening 65, wherein the oil flows toward the bearing of the ring gear 150 positioned at the rear wall 200.

the oil discharged from the through opening 65 may be scattered due to the influence of the oil churned by the ring gear 150 and moves to the lower side while scattering together with the oil churned by the ring gear 150 without falling in a direction perpendicular to the ground.

At this time, the baffle 205 guides the oil falling in a direction biased to the rotational direction of the ring gear 150 due to the influence of the oil churned by the ring gear 150 to flow toward the bearing of the ring gear 150.

After all, the embodiment of the present invention is preferably configured to have the baffle 205, wherein the oil discharged from the through opening 65 of the reduction driven gear 60 is guided effectively to the bearing side of the ring gear 150, so that it is possible to utilize the oil which is used in lubricating the reduction driven gear 60 again in lubricating the bearing of the ring gear 150 without necessary to provide a separate oil path and hence effective oil lubrication is facilitated.

On the other hand, in the lubricating apparatus 100 for a differential device of the vehicle according to an exemplary embodiment of the present invention, the first baffle 205 is formed in a plate shape extending along a radial direction of the ring gear 150 as shown in FIG. 4.

In the embodiment of the present invention, the first baffle 205 is formed in a plate shape having a length extending along a radial direction of the ring gear 150. The first baffle 205 may be produced separately and then coupled to the rear wall 200 of the gear casing 170, or otherwise formed integrally with the rear wall 200.

As the oil discharged from the first opening 203 is subjected to centrifugal force by the ring gear 150, it may be scattered toward a tangential or circumferential direction of the ring gear 150 at the time when it is discharged. Therefore, the first baffle 205 is preferably arranged such that it is spaced apart from the first opening 203 in a circumferential direction and then positioned in the upper side of the first opening 203 and extends in the radial direction of the ring gear 150, thereby effectively blocking the scattering of the oil discharged from the first opening 203. FIG. 4 shows a configuration that the first baffle 205 of such a shape is provided.

On the other hand, in the lubricating apparatus 100 for a differential device of the vehicle according to an exemplary embodiment of the present invention, the baffle 205 is provided as a pair of baffles, wherein the oil discharged from the through opening 65 flows into a gap space formed between the pair of baffles as shown in FIG. 4.

in the exemplary embodiment of the present invention, the baffle 205 is preferably provided as a pair of baffles and the oil flows into the gap space formed between the baffles. Preferably, one of the pair of baffles 205 is positioned at a vertical lower side of the through opening 65, or otherwise the vertical lower side of the through opening is positioned at a position between the baffles.

After all, the present exemplary embodiment of the present invention has a pair of baffles 205, wherein the oil discharged from the through opening 65 of the reduction driven gear 60 is guided effectively to the bearing side of the ring gear 150, so that it is possible to utilize the oil which is used in lubricating the reduction driven gear 60 again in lubricating the bearing of the ring gear 150 without necessary to provide a separate oil path and hence effective oil lubrication is facilitated. FIG. 4 shows an example of the shape and arrangement of such baffles 205.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lubricating apparatus for a differential device of a vehicle comprising:
   a ring gear mounted in an inside of a housing mounted at an oil pan, the ring gear being provided such that at least a portion of a lower portion of the ring gear is submerged into oil to churn the oil by being rotated;
   a gear casing including a partition wall which is provided to surround an outer peripheral surface of the ring gear and allows the oil to flow into between the partition wall itself and the ring gear and a restriction part which is located in a front of the ring gear and formed with a top end portion facing an upper portion of the housing to limit an amount of the oil flowing into between the partition wall and the ring gear;
   a rear wall arranged in the gear casing to shield a rear face of the ring gear;
   a through opening provided on an axis of a reduction driven gear mounted on a top portion of the ring gear, the through opening being provided such that the through opening extends along an axial direction of the reduction driven gear so that the oil flows therein; and
   a first baffle provided to be projected from the rear wall toward a rear side thereof and guide the oil discharged to the rear side of the gear casing through the through opening, wherein the oil flows toward an axis of the ring gear.

2. The lubricating apparatus for the differential device of the vehicle of claim 1, wherein the restriction part extends from a portion of the partition wall surrounding a lower side of the ring gear along an axial direction of the ring gear to block the oil positioned at a height below the top end portion from flowing into between the ring gear and the partition wall.

3. The lubricating apparatus for the differential device of the vehicle of claim 2, wherein the restriction part extends from the partition wall to an inner wall of the housing located at a front side of the ring gear.

4. The lubricating apparatus for the differential device of the vehicle of claim 1, wherein the restriction part is provided to shield a front side of a lower side of the ring gear among an open front face of the gear casing so that the restriction part blocks the oil positioned at a height below the upper end portion from flowing into between the ring gear and the partition wall.

5. The lubricating apparatus for the differential device of the vehicle of claim 1, wherein the gear casing is provided with the rear wall for shielding the rear face of the ring gear and wherein the rear wall is formed with a first opening at a position on a peripheral side thereof, to which the oil rises by being churned by the ring gear, so that at least a portion of the oil being churned by low speed rotation of the ring gear is discharged through the first opening.

6. The lubricating apparatus for the differential device of the vehicle of claim 5, wherein the partition wall is formed with a second opening at a position where the oil rises by being churned by the ring gear so that at least a portion of the oil being churned by high speed rotation of the ring gear is discharged through the second opening.

7. The lubricating apparatus for the differential device of the vehicle of claim 1, wherein the first baffle is provided in a plate shape extended along a radial direction of the ring gear.

8. The lubricating apparatus for the differential device of the vehicle of claim 1, wherein a second baffle is provided to be projected from the rear wall toward the rear side thereof and spaced with the first baffle such that the oil discharged from the through opening can flow into a gap space where the first and second baffles are spaced with each other.

\* \* \* \* \*